(12) United States Patent
Moore et al.

(10) Patent No.: US 6,480,469 B1
(45) Date of Patent: Nov. 12, 2002

(54) DIAL-UP ACCESS RESPONSE TESTING METHOD AND SYSTEM THEREFOR

(75) Inventors: Paul D. Moore, Durham, NC (US); Sherman S. LaCost, Durham, NC (US); Jeff Coburn, Cary, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/212,209

(22) Filed: Dec. 16, 1998

(51) Int. Cl.[7] .......................... H04M 1/24; G01R 31/08; H04J 1/16
(52) U.S. Cl. ....................... 370/241; 370/245; 370/242; 379/14; 379/1.01; 379/9.04; 379/29.01; 379/29.1
(58) Field of Search ...................... 379/9.04, 14, 14.01, 379/15.01, 15.02, 1.01, 29.01, 29.1, 9; 714/37, 38, 43, 44, 45, 31, 712, 25; 370/241, 248, 242, 245, 247, 249, 908

(56) References Cited

U.S. PATENT DOCUMENTS

| | | | | |
|---|---|---|---|---|
| 5,835,566 A | * | 11/1998 | Cowgill | 379/10 |
| 5,943,391 A | * | 8/1999 | Nordling | 379/1 |
| 5,946,372 A | * | 8/1999 | Jones et al. | 379/1 |
| 5,966,427 A | * | 10/1999 | Shaffer et al. | 379/29 |
| 5,987,633 A | * | 11/1999 | Newman et al. | 379/15 |
| 6,011,838 A | * | 1/2000 | Cox | 379/113 |
| 6,091,713 A | * | 1/2000 | Lechleider et al. | 379/27 |
| 6,041,041 A | * | 3/2000 | Ramanathan et al. | 370/241 |
| 6,052,456 A | * | 4/2000 | Huang | 379/201 |

\* cited by examiner

*Primary Examiner*—Rexford Barnie

(57) ABSTRACT

The present invention system automates the process of testing the integrity of the components residing at each node of a data network. After automatically dial connecting to a site of the network by selecting a telephone number from a retrieved list of telephone numbers each representing a site of the network, the instant invention sends a query directed to a particular component at the site. And depending on the response/non-response received, the instant invention can readily determine whether there is a problem with the being queried component. If there is a fault detected, this fault is reported either as a HTML file or a text file to either a web site or a data store, so that a technician can readily retrieve that information when needed. After all components at a site are tested, a report of the operational effectiveness of each of the components could be generated and provided either to the web site or dumped into the data store. Thereafter, the instant invention proceeds to retrieve a second telephone number from the list of telephone numbers and dial into the site to which that second telephone number relates. This process of automatically dial-in testing the components at a site is repeated until all telephone numbers, i.e. all sites, on the list have been contacted. The present invention system thereafter can repeat the process so that the integrity of the nodes of the data network can continuously be monitored.

9 Claims, 3 Drawing Sheets ns network. Specifically, the present invention dial up access
DIAL-UP ACCESS RESPONSE TESTING METHOD AND SYSTEM THEREFOR

FIELD OF THE INVENTION

The present invention relates to a method of testing the various nodes of a data network and more specifically a method of determining the operational effectiveness of the various components at each site of the data network.

BACKGROUND OF THE INVENTION

A telecommunications network, such as for example a data network, that has a number of interconnected sites of a company may have at each of those sites a number of components which operations require verification from time to time. For example, in the case of a chain of department stores that has stores at different geographical locations, the various cash registers at each of those stores are communicatively interconnected to a hub; and by means of a router, information from those cash registers can be routed to a regional router and then to the headquarters of the chain, so that the management of the store chain could determine how much sales were made at each of those registers, as well as the kind of merchandise sold and whether given types of merchandise need to be reordered and shipped to those stores.

Prior to the instant invention, to test the operational effectiveness of the various components at each of the sites, a cadre of technicians have to manually input test signals into each of the components at each of the sites of the network. Such manual testing of the various components of the network takes up an inordinate amount of time, for example a great number of weeks for a moderate size company. Further, in order to accurately test the operational effectiveness of the various components of the data network, prior to the technicians manually inputting the queries, the various components, such as for example the routers, have to be taken off line by having its various interconnections severed. Obviously this manual connection/disconnection of the various components of the network is quite inefficient. Moreover, by disconnecting the various components, the network is put into jeopardy by having a portion thereof, which may very well be an important portion, disconnected. Furthermore, the process of manually connecting into the different components of the network, insofar as it is labor intensive, means that the process is subject to chronic mistakes due to inherent technician errors. This is magnified by the fact that there are oftentimes thousands of sites, or nodes, in each of the data networks. Finally, such manual testing of the different components of the network, needless to say, is quite expensive.

Accordingly, a less disruptive but yet scalable method of testing the integrity of the different components of a data network is desirable. It is moreover desirable that such testing method be less expensive than the conventional way of testing the integrity of the components of the data network.

SUMMARY OF THE INVENTION

The present invention is a method that automates the testing of the different components of a telecommunications network. Specifically, the present invention dial up access response testing (DARTS) system/method provisions a communicative means, such as for example a computer or a laptop, to automatically dial into each site or node of the network so that a series of tests may be run at each of the sites. These series of tests may be configured as particular queries for each component at each site. After a query has been sent to a particular component, the communicative means waits to receive a response from that component. Depending on the response, the system determines automatically whether or not that component is operating effectively. Irrespective of whether a particular component is operationally effective, after the various components at a particular site have been queried and responses tallied, if there are problems found at the site, those problems are identified and provided as a report to the technicians and engineers of the network, thereby saving them from having to troubleshoot a malfunction from scratch. The presentation of the report may be in the form of a web page, so that a technician can readily retrieve the information from the Internet.

To test the myriad sites or nodes of a network, the system retrieves a list of telephone numbers from a data store. This list may be in the form of a flat file or a database file. Each telephone number in the list represents a particular node or site of the network. Once the list of telephone numbers is retrieved, the present invention system begins to dial connect to a first one of the telephone numbers in the list so as to communicatively connect to the site to which that telephone number corresponds.

For connection, a technician can simply dial connect by means of a plain old telephone system service (POTS) line and gain access to the site by means of a modem thereat. The modem in turn is connected to a switch box that, in receipt of the appropriate query or test signals, routes that query to the appropriate component at the site which may, for example, be a hub or a router. And depending on the query, a particular response is provided by the component and returned to the present invention system for recordation and analysis. If the response is deemed to be deficient, the system will generate an alert, in the form of a failure, to the appropriate personnel manning the system. Additional queries or test signals are also sent by the system to the other components in the site for testing the operational effectiveness of those components.

Once the components of a particular site all have been tested, or if it is found that one of the components of the site has responded in an unacceptable fashion, the system marks the site as containing equipment that may not be functional. The system then proceeds to retrieve a second telephone number from the list of telephone numbers, and dial connects to the site of that number in order to test the integrity of the various components at that site. The process continues until all of the of interest nodes or sites of the network have been tested, as the system goes through the list of telephone numbers retrieved from the data store.

After all of the of interest sites have been tested, the system generates a report detailing the operational effectiveness of the various sites and particularly the different components in each of those sites. The system can moreover retest those sites that the system has identified as being problematic. Thereafter, the process is reinitiated so that the functionality of the various sites of the network could be continuously monitored.

It is therefore an objective of the present invention to provide an automated process of testing the operational effectiveness of the various components or equipment in each node or site of a telecommunications network It is another objective of the present invention to generate a report that identifies the particular problems for each component of the site of each network for the technicians and engineers who oversee the operations of the network, so that those technicians and engineers can readily and narrowly focus their attention to the problematic sites, and particularly the problem components within those sties.

It is moreover an objective of the present invention to provide a simple system for monitoring the operational effectiveness of the nodes of a data network without requiring any extraneous and unnecessary modifications to the various nodes of the network.

It is yet moreover another objective of the present invention to provide a testing system that is scalable so as to be adaptable for different types of networks, as the test signals or queries for each of the components of each node of the network can be customized.

BRIEF DESCRIPTION OF THE FIGURES

The above-mentioned objectives and advantages of the present invention will become apparent and the invention itself will be best understood with reference to the following description taken in conjunction with the accompanying drawings, wherein.

DESCRIPTION OF THE PREFERRED EMBODIMENT OF THE INVENTION

Figure 1:
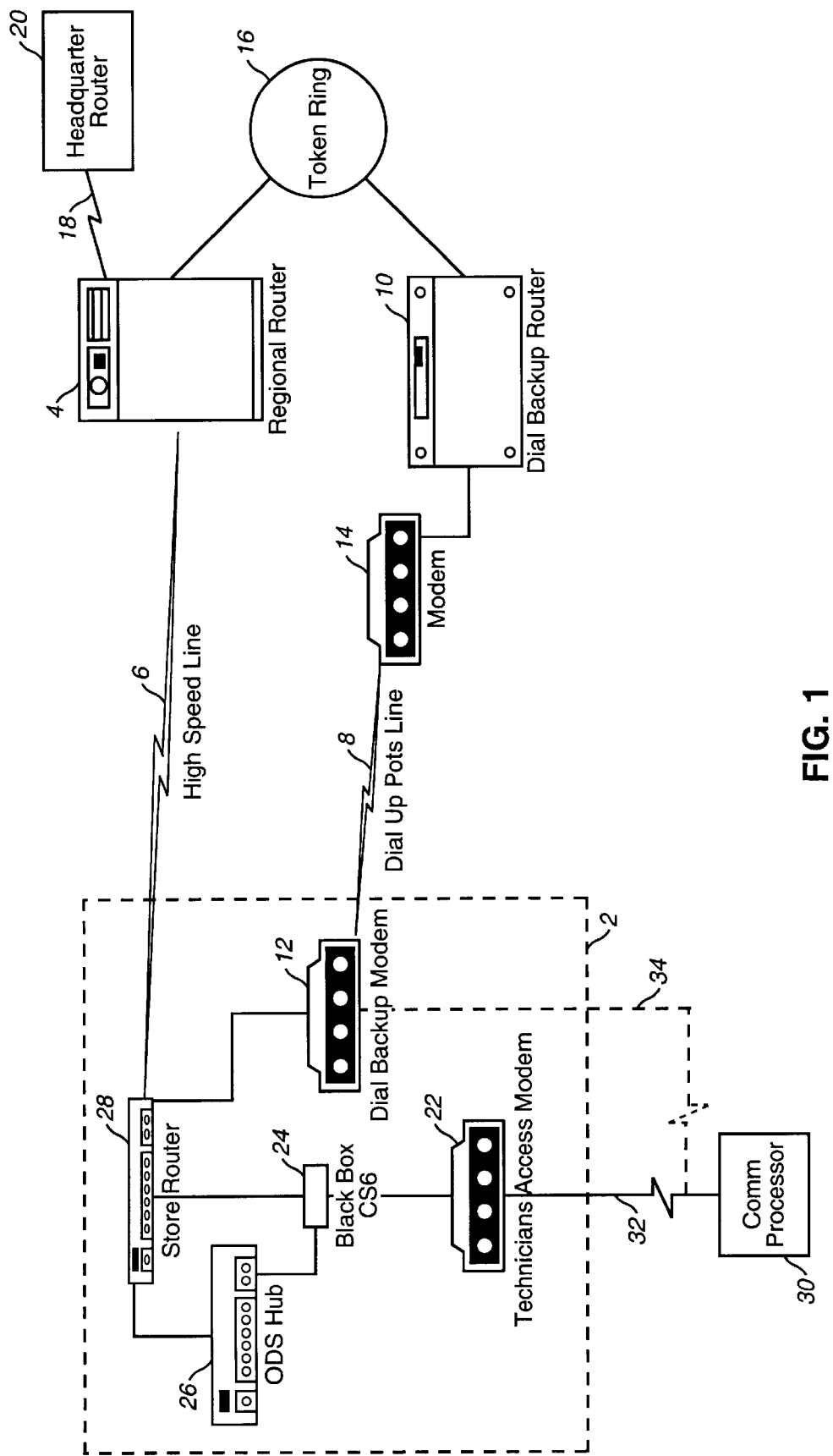
FIG. 1 is a schematic for illustrating the various components of an exemplar telecommunications network equipped with the testing system of the instant invention.

With reference to FIG. 1, a telecommunications network, or more specifically a data network, is shown to have a node or site 2 communicatively connected to a regional router 4 by means of a high speed line such as for example an ISDN line 6. The data network is further shown to have a plain old telephone service (POTS) line 8 which connects node 2 to a dial backup router 10, by means of a pair of modems 12 and 14. Regional router 4 and dial backup router 10 are shown to be connected by means of a token ring network 16, which may in turn be substituted by an Ethernet or other similar area network connections. Regional router 4 is further shown to be communicatively connected, by means of a line 18, to a headquarter router 20. Although only one node, namely site 2, is shown, it should be appreciated that in a data network there are usually a plurality of nodes that are connected to a single regional router. Similarly, instead of only one regional router as shown in FIG. 1, there are in actuality a number of regional routers each of which has connected thereto a number of nodes in a typical data network. Thus, the showing of only a single node and a single regional router, as well as a single dial backup router 10, in FIG. 1 is meant only to illustrate for the sake of simplicity the instant invention.

Continuing with FIG. 1, note that there are a number of components residing at site 2. In particular, in addition to dial backup modem 12, there is a technician access modem 22. These modems may each be considered as an input/output port of node 2. Connected to modem 22 is a black box switch namely a CS8 switch 24. This CS8 switch is custom made and functions essentially as a relay for routing signals to the different components in node 2. More specifically, in response to a component identification signal such as for example an 8 digit signal 00000001, switch 24 will connect any incoming signal thereafter to the appropriate component in the node. For example, when in receipt of a signal such as the above-noted 00000001, switch 24 may route the query signal that comes thereafter to the store router 28. On the other hand, if switch 24 were to receive a component identification signal of 00000002, then it will direct any test signals inputting thereto to hub 26. For convenience, switch 24 may have a serial interface such as for example a DB9 or DB25 connection, both to modem 22 and to the respective components to which it is connected.

Further shown to be residing in node 2 is a hub 26 which, as shown, is one that is made by the ODS Company. Other types of hubs such as for example ones that are made by Cabletron may also be used. Connected to hub 26 and CS8 switch 24 is a store router 28, which is a router that is manufactured by a number of companies such as for example Bay, Ascend, or Cisco, etc. Store router 28, in addition to the connections to switch 24 and hub 26, is also connected dial backup modem 12. To enable node 2 to communicate with regional router 4, high speed line 6 connects store router 28 to regional router 4.

Node 2 may for example be representative of one store of a nationwide store chain that has at each store a number of processing machines such as for example cash registers. Each of those cash registers may in turn be connected to a hub, such as for example hub 26, so that the transactions that take place at each of the registers may be recorded and routed to hub 26, and then to router 28. This is important for enhancing the efficiency of the store chain in that by knowing substantially immediately the types of transactions that take place in the store, the management of the store chain knows on a substantially real time basis the kind of sales that each store is generating, the types of merchandise that are being sold and how best to restock the shelves of the store. Thus, by using hub 26 and router 28, the goings on in a particular store at a given site can be monitored by the management of the store chain, via the information that is sent by router 28 to regional router 4, and from there, via possibly frame packets over line 18, sent to headquarter router 20.

Prior to the instant invention, to ensure that each of the components at a node is operating correctly—at least with respect to the connections between the store router and the regional router, a large number of technicians are required to manually dial into the store. The instant invention eliminates such labor intensive practice by provisioning a communicative means, such as for example a computer or laptop equipped with the appropriate communication module such as for example a modem, to connect to any available modem at each of the nodes of the data network. This is illustrated for example by the communication processor 30 being connected to modem 22 by means of a connection line 32. Alternatively, processor 30 may be connected to modem 12 by means of the dotted communication line 34.

Figure 2:
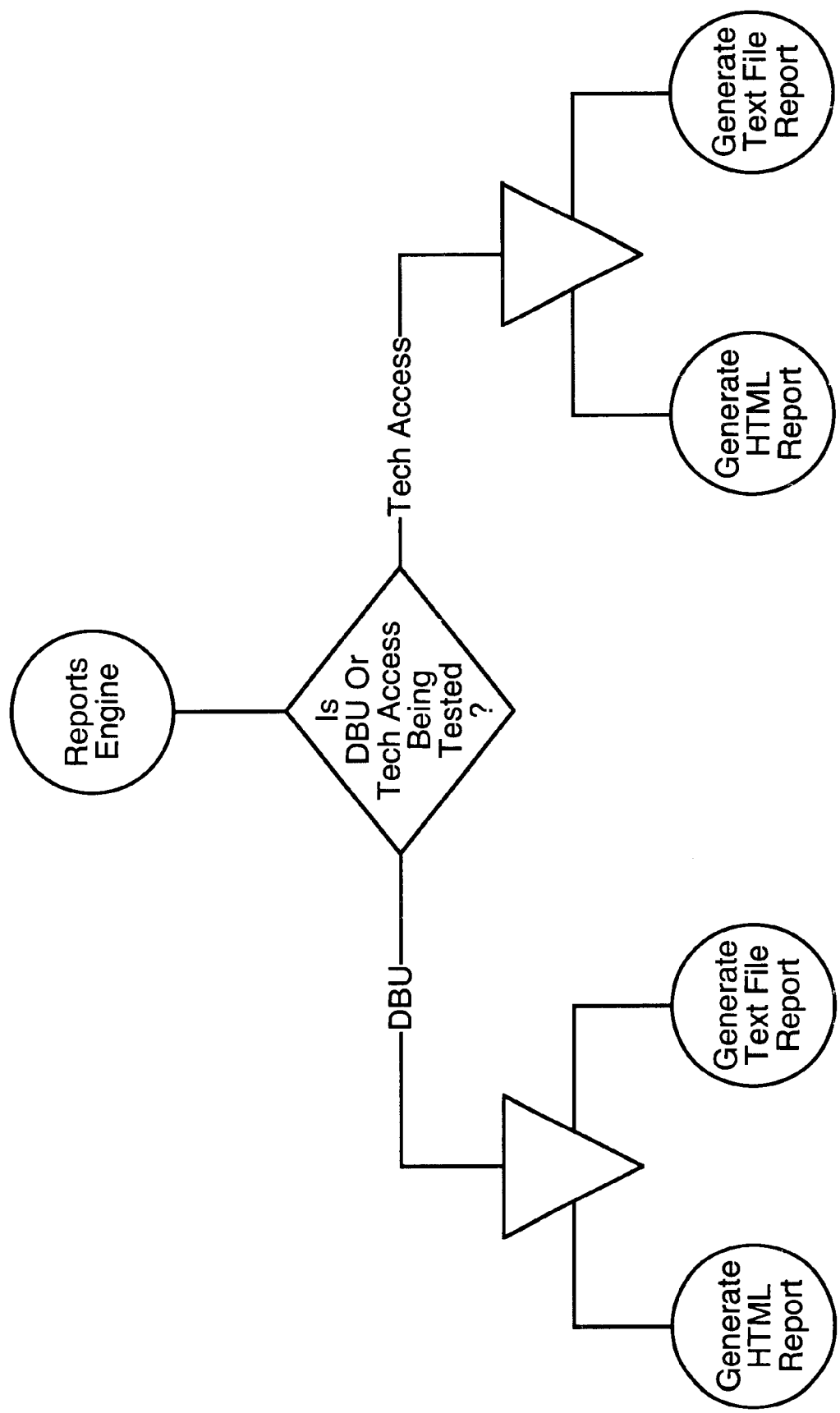
FIG. 2 is a diagram illustrating the two different types of testing effected by the system of the instant invention.

FIG. 2 illustrates that there are two tests that could be performed by processor 30. These tests are, as shown, a dial backup test (DBU) or a technician access test. Each of the tests is similar in the sense that after each of the tests, the report generated there by may either be a HTLM report or a text file report. The HTLM report may be sent to an Internet web site that technician located anywhere only needs to gain access to the web site to retrieve. The text file report may be sent to the headquarters, or if needed, forwarded to a technician by conventional methods, including but not limited to E-mail for example.

The reason that there are two types of tests for the system of the instant invention is that processor 30 may gain access to node 2 by means of either technician access modem 22 or dial backup modem 12. In the case of processor 30 gaining access to node 2 by means of modem 22, note that switch 24 would route whatever test signals or queries being submitted by processor 30 to whichever component those queries are directed. On the other hand, if processor 30 were to gain access to node 2 by means of dial backup modem 12, the first component that it will gain access to is store router 28. In either case, whether or not there is a good connection from router 28 to outside of node 2 can be readily ascertained.

In addition to determining the integrity of the connection of router 28 to outside of node 2, the connections of the various components within node 2 may also be ascertained, by means of test signals or queries directed to those specific components. For example, by sending a test signal to hub 26 to request that it send back a predetermined response, if hub 26 fails to send back such predetermined response, then processor 30 will know promptly that there is a problem with hub 26, either due to its connection to processor 30 or that hub 26 may in fact have malfunctioned.

The reason that there is a dial backup modem in node 2, in addition to the main access modem 22, is that it is desirable to provide redundancy, both for testing and for the information being provided by router 28 to regional router 4. In particular, high speed line 6 that connects store router 28 to regional router 4 could encounter a fault, such as for example a cut, that disconnects store router 28 from regional router 4. If that happens, by means of backup modem 12, store router 28 can reroute its connection to dial backup router 10 by means of dial backup modem 12, POTS line 8 and modem 14. Thus, the operation of the various components at node 2 can continue without interruption.

Dial backup modem 12 can also be used by processor 30 to gain access to node 2, and specifically the different components residing therein such as for example store router 28 connected directly to dial backup modem 12. By testing the integrity of node 2 via connection line 34, processor 30 can determine the functionality of modem 12, i.e., whether it is operational, as well as router 28 directly.

On the other hand, if processor 30 were to test the integrity of node 2 by means of connection 32 to technicians access modem 22, it can make a first determination on whether modem 22 is operational. Thereafter, processor 30 can input a test signal or a query to switch 24, which in receipt of the signal makes a determination on which component that signal should be routed to and then proceeds to route the signal to that particular component. The component, for example hub 26, in receipt of signal, sends out a positive response, if it is functional and therefore able to decipher the incoming test signal so as to respond with the appropriate response. On the other hand, if hub 26 fails to respond to the test signal, then processor 30 knows that there either is a non-connection between switch 24 and hub 26, or that hub 26 has malfunctioned. The same type of testing logic is also effected for the different components within node 2.

Although only store router 28 and hub 26 are shown to be residing in node 2, it should be appreciated that other components such as a channel server unit/data server unit (CSU/DSU) may also reside in the same site or node of the network. There may furthermore be residing in a particular site an office channel unit (OCU) which could likewise be tested for its operational effectiveness, or operativeness, by processor 30.

Figure 3:
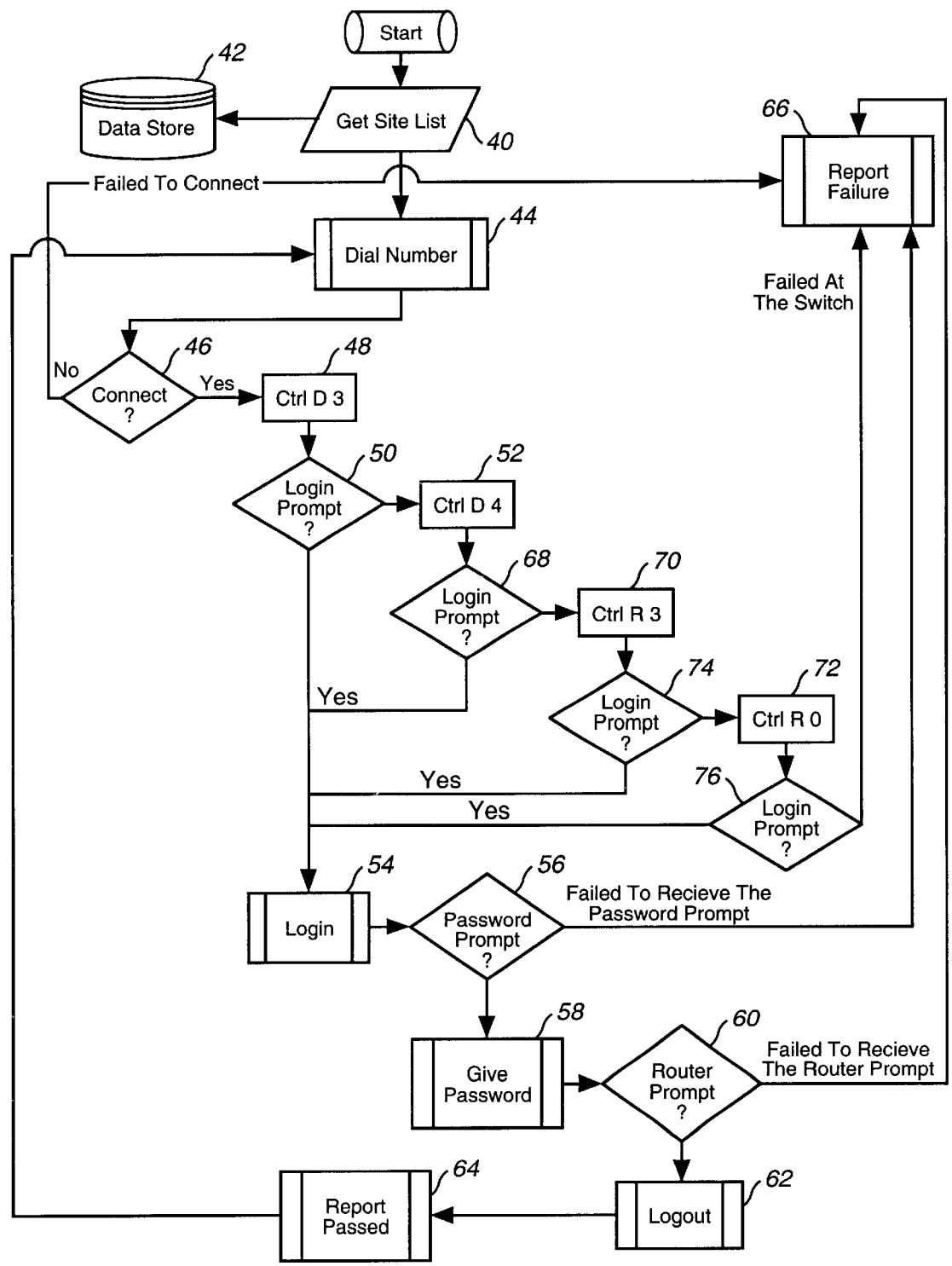
FIG. 3 is a flow chart illustrating the operation of the instant invention system.

The operation of the system of the instant invention, which may for example be embodied in a program that could be incorporated into a diskette, a CD Rom, a compact disk or other conventional data storage medium, is shown in FIG. 3. Note that the program in FIG. 3 may be a Visual Basic program which incorporates a modular design that allows the program to be modified quickly and tests networks with various types of configuration. In other words, the system of the invention is provisioned to have the scalability so as to be adaptable to operate with different networks.

With specific reference to FIG. 3, to begin, the system, at step 40, retrieves from a data store 42 either a flat file or a database file that contains a list of telephone numbers. The telephone numbers each are representative of a site or node of the network. With the list of telephone numbers on hand, the system of the instant invention proceeds to step 44 whereat a first telephone number is selected and dialed. At step 46, the system waits to find out whether a connection is made to the site to which the telephone number is directed. If there is no connection, such failure to connection is reported, per step 66. If there is a connection, by means of a specific key input such as for example control D3 as shown at step 48, the processor 30 can gain access to a particular component residing at that site. For the instant invention, the being accessed first component may in fact be considered to be the highest level component at the site. Such component may very well be store router 28.

At step 50, the system waits to receive a log in prompt. If it is not received, the system proceeds to step 52 to attempt to login to the next lower level component such as for example hub 26. On the other hand, if the login prompt is successful at step 50, the system proceeds to login at step 54. Thereafter, the password is provided to switch 24 when the system receives a password prompt at step 56. Once the password is given per step 58, a prompt for the router is provided at step 60. If the appropriate router prompt is provided in response to step 60, the system logs out per step 62. Thereafter, it generates a report that the component passes its test, per step 64, and then proceeds back to step 44 to retrieve a second telephone number from the list of telephone numbers for testing another site of the network. Note that the report generated at step 64 may in fact be dumped into data store 42 for future reference and/or comparison with previously stored data.

Returning to router prompt at step 60, if none is given, then obviously something must be wrong with the connection to router 28, or that router 28 has malfunctioned since it is not responding to the test query. Subsequently, such failure is reported, per step 66. Similar to the passed report generated at step 64, the failure report likewise can be dumped into data store 42 for future reference. Alternatively, both the passed and failure reports may be generated as HTML reports sent to a particular web site in the Internet, so that a technician can readily retrieve the report to determine the trending information and history for the particular component at that site.

Returning to step 52, the same process as discussed above takes place with respect to the second level component being tested. Again a login prompt is provided at step 68. If the appropriate response is provided, then the process proceeds to login at step 54, so that the process repeats as discussed above. In the case that no password prompt is received, the system knows that there has been a failure. This failure is in turn reported, per step 66.

Similarly, the other components residing at a particular site can be tested per steps 70 and 72 (and other additional steps if there are more than 4 components at the being tested site), along with their respective login prompts 74 and 76. So long as every component tested at the site responds positively to the query directed thereto, a positive report is generated. Alternatively, no action needs to be taken. However, if there is a failure in any one of the components at the site, be it a disconnection or a malfunction of the component, such failure is reported.

The process of testing each of the components, as represented by steps 48, 52, 70 and 72, continues until the process reaches step 76, at which point if there is a failure at the node, such failure will be reported as a switch failure. By thus testing the integrity of the respective components residing at a particular node, and starting such testing from the highest level component to the lowest level component, the system of the instant invention is able to substantially pinpoint a problem at the node automatically without any intervention by any technician. And once having located the particular problem at a site, the system can send an alert to notify a technician on standby who can then go to that site, readily locate the problem in view of the report generated by the instant invention system and correct the problem accordingly.

As was noted above, the information from the testing of each of the sites of the network may be dumped into a database, such as for example data store 42, so that the thus collected information may be provided to the network management center. Moreover, given that the process of the instant invention as illustrated in FIG. 3 may be incorporated into a data medium such as for example a CD rom or a diskette, a technician in the field with a lap top equipped with a modem can readily gain access and test the integrity of any site of the network wherever he may be. Moreover, by being able to gain access to the reports provided at the web site, a technician can readily see for himself the operational effectiveness histories the various components at a site may have, thereby enhancing his ability to repair any component malfunction or disconnection. Furthermore, by eliminating the labor intensive manual dial in connections of the prior art, the instant invention system lowers substantially the cost for testing the operational effectiveness of the data network.

Inasmuch as the present invention is subject to many variations, modifications and changes in detail, it is intended that all matter described throughout this specification and shown in the accompanying drawings be interpreted as illustrative only and not in a limit sense. Accordingly, it is intended that the invention be limited only by the spirit and scope of the hereto appended claims.

What is claimed is:

1. An access response testing system for testing components at sites in a network, comprising:
   a communication processor configured to transmit first and second test signals to at least one site in the network;
   the at least one site in the network comprising:
     a hub component,
     a router component,
     a first modem component configured to receive the transmitted first test signal and send the first test signal to a switch component,
     a second modem component configured to receive the transmitted second test signal and send the test signal to the router component,
     the switch component configured to:
       receive the first test signal, and
       route the first test signal to at least one of the hub component and router component,
     wherein the at least one of the hub component and router component is configured to respond to the first and second test signals if functioning properly,
   wherein the communication processor is further configured to:
     determine if a response to the first and second test signals is received,
     assign at least one operational effectiveness parameter to the at least one of the hub component and router component based on the response or lack of response to the first and second test signals, and
     send the at least one operational effectiveness parameter to a data storage device associated with a website, the data storage device configured to display the at least one operational effectiveness parameter on a web page of the website to which a technician can gain access.

2. The system of claim 1, wherein the hub component is connected to a plurality of processing machines.

3. The system of claim 1, wherein the router component connects to a regional router via a high-speed link.

4. The system of claim 3, wherein the high-speed link comprises an ISDN link.

5. The system of claim 3, wherein the second modem is further coupled to a backup router.

6. The system of claim 5, wherein the backup router and regional router are interconnected via a local area network.

7. The system of claim 6, wherein the local area network comprises a token ring network.

8. A method of testing a response of components in at least one site in a network, each site comprising a hub component, a router component, a first modem component and a second modem component, the method comprising:

retrieving first and second telephone numbers corresponding to a first site in the network from a list of telephone numbers;

dialing a first connection to the first site using the first telephone number;

dialing a second connection to the first site using the second telephone number;

transmitting, via the first connection, a first test signal to the first modem component at the first site;

relaying the first test signal from the first modem component to at least one of the hub component and the router component of the first site;

transmitting, via the second connection, a second test signal to a second modem component at the first site;

relaying the second test signal from the second modem component to the router component;

receiving, responsive to the first and second test signals, at least one response signal from at least one of the hub component and the router component if the components are functional; and assigning at least one operational effectiveness parameter to the at least one hub component and the router component of the first site based on the response or lack of response to the first and second test signals;

sending the assigned at least one operational effectiveness parameter to a data storage device of a website; and displaying the at least one operational effectiveness parameter on a web page of the website to which a technician can gain access.

9. The method of claim 8, further comprising:

retrieving a second telephone number corresponding to a second site in the network from the list of telephone numbers;

dialing a second connection to the second site using the second telephone number;

transmitting a second test signal to the first modem component at the second site;

relaying the second test signal from first modem component to at least one of the hub component and router component of the second site;

receiving a second response signal from the at least one of the hub component and router component of the second site if the component is functioning properly; and assigning an operational effectiveness parameter to the at least one hub component and router component of the second site based on a response or lack of response to the second test signal.

* * * * *